Sept. 23, 1969 R. L. COLLING 3,468,168
PHOTOELECTRIC ERROR DETECTOR
Filed Aug. 10, 1965

INVENTOR.
Ronald L. Colling
BY
Albert F. Duke
ATTORNEY

United States Patent Office 3,468,168
Patented Sept. 23, 1969

3,468,168
PHOTOELECTRIC ERROR DETECTOR
Ronald L. Colling, Davison, Mich., assignor to General Motors Corporation, Detroit, Mich., a corporation of Delaware
Filed Aug. 10, 1965, Ser. No. 478,664
Int. Cl. G01p 3/22
U.S. Cl. 73—519
11 Claims

ABSTRACT OF THE DISCLOSURE

A photoelectric speed error detector is disclosed and includes rotatably mounted carrier and shutter elements movable through an arcuate path proportional to actual vehicle speed. The carrier element mounts a photocell in the path of radiant energy emitted from a light source. The shutter element is positioned between the light source and the photocell and is adapted to reduce the light impinging on the photocell in response to any relative movement between the two elements. An electromagnet energizable by the vehicle operator is adapted to arrest movement of the carrier so that an output signal developed by the photocell is indicative of the difference between the actual speed of the vehicle and the vehicle speed prevailing at the time of energization of the electromagnet.

---

This invention relates to error detectors and more particularly to a photoelectric error detector for use in control mechanisms which maintain a vehicle at a predetermined road speed under varying load conditions. Such mechanisms are sometimes referred to as vehicle cruise controls.

The prior art cruise control error detectors receive two speed inputs. One input is a manual adjustment whereby the operator of the vehicle sets the desired cruising speed. The other input is the actual vehicle speed. The error detector compares the actual speed to the desired speed and determines the difference between the two to provide an error signal. This signal is then fed to control apparatus for modifying the actual speed of the vehicle so as to reduce the error signal to zero thus maintaining the actual vehicle speed at the desired speed.

The present invention represents an improvement over the prior art in the elimination of the necessity for the driver to manually set the desired cruising speed. In accordance with the present invention, an error detector is provided wherein a cruising mode of operation may be initiated over a wide range of vehicle speed without the necessity for manually setting of the desired cruising speed. The speed error detector of the present invention includes means for following or tracking the actual vehicle speed and allows the driver to lock the system into the cruising mode of operation whenever the prevailing speed of the vehicle is at a desired cruising speed.

A more complete understanding of the present invention may be had from the following detailed description which should be read in conjunction with the drawings in which.

Figure 1:
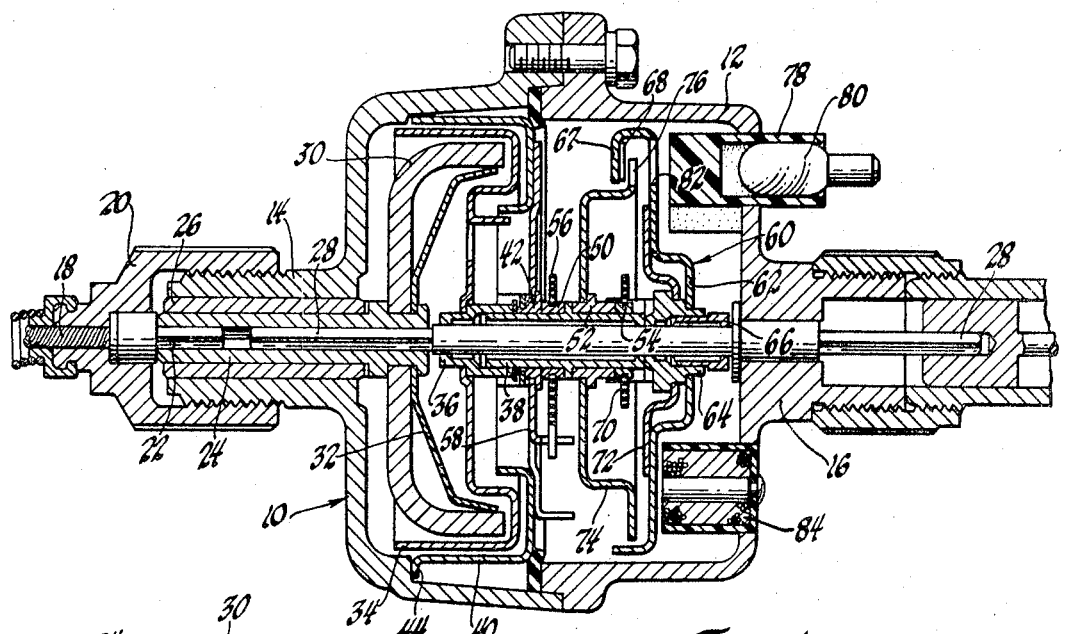
FIGURE 1 is a sectional view of the speed transducer of the present invention.
Figure 2:
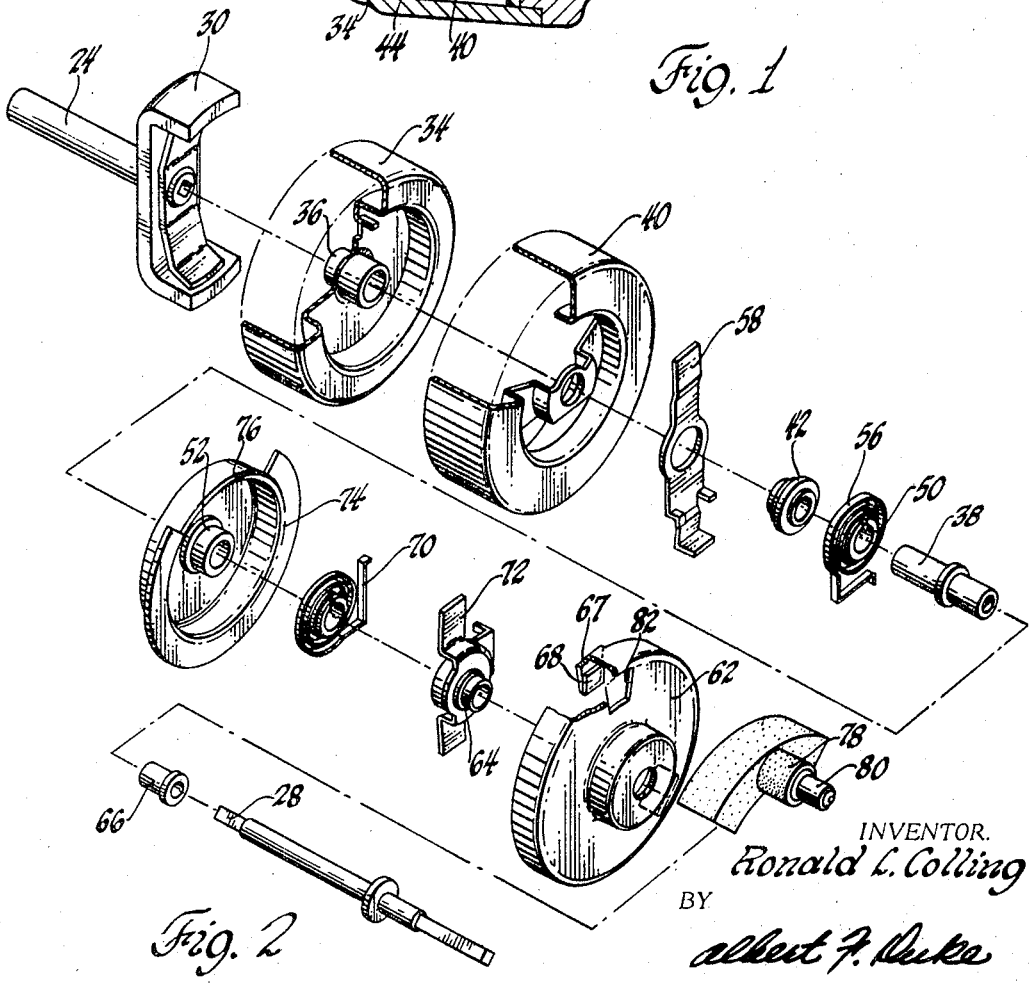
FIGURE 2 is an exploded view of the speed transducer.

Referring now to the drawings, there is illustrated an error detector unit 10 which may be installed in any suitable position in the speedometer's drive line. For convenience, however, it is preferably installed adjacent the speedometer.

The unit 10 comprises a two-part housing 12 having tubular shank portions 14 and 16. The speedometer drive cable 18 extends through a retainer cap 20 which threadingly engages the tubular shank portion 14 and is provided with a squared end portion 22 which is received by a drive shaft 24. The drive shaft 24 rotates in a bearing 26 received in the tubular shank portion 14. A driven shaft 28 extends through the unit 10 and is adapted to drive the vehicle speedometer.

A permanent magnet 30 and a temperature compensating element 32 are secured to and driven by the shaft 24. An eddy current speed cup 34 is mounted on a speed cup bushing 36 which in turn is press-fitted to an upper bearing bushing 38. Thus, the bushings 36 and 38 form a composite hollow shaft assembly rotatable about the shaft 28 by the speed cut 34. A field plate 40 is mounted on a bushing 42 and is flanged as at 44 for attachment to the housing 12. A hair spring mounting collar 50, a bushing 52, and a torsion spring mounting collar 54 are press-fitted to the bushing 38. A main hair spring 56 is torsionally wound and has its inner end secured to collar 50 and its outer end secured to a hair spring adjusting member 58 which may be rotated on the bushing 42 to pretension the spring 56. As is well known to those skilled in the art, when the drive shaft 24 is rotated at a speed proportional to vehicle speed by the cable 18, the relative rotation between the permanent magnet 30 and the eddy current speed cup 34 produces eddy currents within the cup. The magnetic field produced by these eddy currents reacts with the magnetic field of the permanent magnet to rotate the eddy current speed cup against the bias of the spring 56 an amount proportional to vehicle speed.

A photocell assembly generally designated 60 includes a carrier 62 mounted on a bushing 64 which is press-fitted to a bushing 66 forming a second composite hollow shaft assembly rotatable about a portion of the shaft 24. The carrier 62 includes a projection 67 on which a photocell 68 is mounted. The photocell 68 is preferably of the silicon junction photo-voltaic type and develops an output voltage in accordance with the amount of light impinging thereon. A torsion spring 70 has its inner end secured to the collar 54 and its outer end secured to a spring-adjusting member 72 which frictionally engages the carrier 62 but which may be rotated relative to the carrier to pretension the spring 70. A scanning disk 74 is secured to the bushing 52 and therefore rotates with the speed cup 34 and includes an arcuate cutout portion 76. A light tube 78 which receives a light bulb 80 is supported in the housing 12 and directs light from the bulb 80 through an opening 82 in the carrier 62 to the photocell 68. An electromagnet generally designated 84 is supported by the housing 12 and is adapted when energized to attract the carrier 62 to prevent movement of the carrier.

It will be apparent from the above description that as the speed cup 34 is rotated in response to rotation of the magnet 30, the scaning disk 74 will also rotate as will the carrier 62 through the action of the spring 70. Thus, the arcuate opening 76 in the scanning disk 74 and the opening 82 in the carrier 62 will be aligned and the photocell 68 will be fully exposed to the bulb 80. When the operator desires to place the vehicle in a cruising mode of operation, it is merely necessary to energize the electromagnet 84 and the bulb 80 whereupon the carrier 62 is drawn into engagement with the core of the electromagnet and prevented from further movement. The shutter 74, however, is still driven by the speed cup 34 and the leading edge of the arcuate cutout portion 76 of the shutter 74 will begin to block the light impinging on the photocell 68. Due to the finite area of the bulb 80 and the photocell 68, the light is cut off gradually as the speed increases and a D-C voltage develops proportional to the difference between the desired cruising speed, i.e., that speed at which the electromagnet 84 is energized and the actual vehicle speed over a predetermined speed range. This D-C voltage may then be utilized in appropriate control circuitry to increase or decrease the vehicle speed so as to maintain the vehicle at the desired cruising speed.

While the invention has been described with regard to a preferred embodiment thereof, this should not be construed in a limiting sense. Modifications and variations will now occur to those skilled in the art. For a definition of the invention, reference is made to the appended claims.

I claim:

1. A motor vehicle speed error detector comprising first and second rotatably mounted members movable in response to an actual speed input,
   means for initiating relative movement of said members by stopping the movement of said second member at a position related to a desired speed, and
   means responsive to the relative rotation of said first and second members for developing an output related to the difference between actual speed and desired speed.

2. An error detector comprising first and second rotatably mounted members resiliently coupled to each other,
   drive means responsive to a variable input for rotating said first member,
   means actuable to arrest movement of said second member at a particular position related to a desired input to said detector, and
   means responsive to the relative rotation of said first and second members for developing an output signal related to the difference between said variable input and said desired input.

3. An error detector comprising a first rotatably mounted member movable in response to a variable input,
   a second rotatably mounted member resiliently coupled to said first member so as to normally rotate therewith,
   means actuable to prevent rotation of said second member whereupon the position of said second member represents a constant input to said detector, and
   means responsive to the relative rotation between said first and second members for developing an output related to the difference between said variable input and said constant input.

4. A speed transducer for developing an output signal related to the difference between an actual speed input and a desired speed comprising a rotatably mounted shutter movable in proportion to said actual speed input,
   speed tracking means resiliently coupled to said shutter and normally movable concurrently with said shutter,
   means actuable to prevent movement of said tracking means beyond a particular position related to a desired speed, and
   means responsive to relative movement between said shutter and said tracking means for developing said output signal.

5. A photoelectric error detector comprising a rotatably mounted shutter,
   a rotatably mounted carrier member,
   light responsive means mounted on said carrier member,
   a source of light for illuminating said light responsive means,
   drive means for angularly positioning said shutter in response to a first input,
   means resiliently coupling said shutter with said carrier member whereby said carrier member normally tracks the movement of said shutter,
   means for preventing movement of said carrier member in response to a second input to initiate relative movement between said shutter and said carrier member in response to a change in said first input,
   relative movement between said shutter and said carrier member causing a variation in the amount of light impinging upon said light responsive means.

6. In a motor vehicle speed control system, a speed transducer for developing an output signal related to the difference between actual vehicle speed and a desired vehicle cruising speed,
   said speed transducer including a first rotatable element movable through an arcuate path proportional to actual vehicle speed,
   a second element,
   means resiliently coupling said first and second elements whereby concurrent arcuate movement is achieved,
   a light source,
   photoelectric means mounted on said second element and adapted to be illuminated by said source,
   said first element being located between said light source and said photoelectric means,
   electromagnetic means adapted to stop the arcuate movement of said second element upon energization thereof when a desired cruising speed is reached,
   relative movement between said first and second elements controlling the amount of light incident upon said photoelectric means.

7. A photoelectric speed transducer for developing an output signal indicative of the difference between the actual speed of a device and the desired speed of a device comprising first and second rotatable support means,
   drive means for rotating said first support means through an angle proportional to said actual speed,
   a carrier element mounted on said second support means,
   a photocell mounted on said carrier,
   a source of light disposed for illumination of said photocell,
   a scanning disk mounted on said first support means projecting between said source and said photocell for controlling the amount of light falling on said photocell,
   spring means coupling said first support means to said carrier element whereby said carrier element tracks the movement of said scanning disk,
   electromagnetic means positioned adjacent said carrier means,
   control means for energizing said electromagnetic means and said light source to prevent further movement of said carrier element.

8. In a speed error detector for developing an output signal indicative of the difference between the actual speed of a device and a desired speed of the device and including a speed sensing element movable in accordance with actual speed of the device and a speed setting element,
   the improvement comprising resilient means for coupling said speed sensing element and said speed setting element to normally provide concurrent movement of said elements,
   means for preventing movement of said speed setting element when it is desired to maintain the prevailing speed of said device and means responsive to relative movement between said elements for developing said output signal.

9. A speed transducer for a motor vehicle speed control system comprising a rotatable carrier member,
   light responsive means carried by said carrier,
   a source of light disposed for illuminating said light responsive means,
   shutter means disposed between said light source and said light responsive means,
   drive means for moving said shutter means in accordance with actual vehicle speed,
   resilient coupling means coupling said drive means to said carrier means whereby said carrier means tracks the movement of said shutter means,
   lock up means for locking said carrier means against further rotation when it is desired to maintain the speed of said vehicle at the prevailing vehicle speed.

10. A speed error signal generator comprising a first shaft assembly rotatable an amount proportional to a sensed speed,
   a second shaft assembly, a set speed assembly rotatable with said second shaft assembly, means resiliently coupling said set speed assembly to said first shaft assembly, said set speed assembly including light sensitive means developing an output signal indicative of the amount of light impinging thereof, a source of light for illuminating said light sensitive means, means for preventing rotation of said set speed assembly when a desired cruising speed is reached, shutter means rotatable with said first shaft assembly and positioned between said source and said light sensitive means for controlling the amount of light impinging upon said sensitive means in accordance with the difference between said set speed and said desired cruising speed.

11. A speed transducer comprising first and second rotatable shaft assemblies, housing means rotatably supporting said shaft assemblies, drive means for rotating said first shaft assembly through an angle proportional to a sensed speed, a carrier element mounted on said second shaft assembly, a photocell mounted on said carrier, a light source supported by said housing means, means directing the light from said source to said photocell, spring means coupling said carrier to said first shaft assembly, a scanning disk mounted on said first shaft assembly projecting between said source and said photocell, said disk having a portion thereof cut away whereby said photocell is normally fully exposed to said source, electromagnetic means supported by said housing means adjacent said carrier, means for energizing said electromagnetic means when the sensed speed reaches a desired speed to prevent further arcuate movement of said carrier, said photocells developing an output signal indicative of the relative movement between said carrier and said shutter.

References Cited

UNITED STATES PATENTS

| | | | |
|---|---|---|---|
| 1,533,674 | 4/1925 | Svenson | 73—491 |
| 2,164,114 | 6/1939 | Kolb. | |
| 2,831,546 | 4/1958 | Henderson | 340—53 XR |

JAMES J. GILL, Primary Examiner

U.S. Cl. X.R.

180—110